United States Patent
Parups

[15] 3,692,302
[45] Sept. 19, 1972

[54] APPARATUS FOR INSERT TRAILING EDGE ALIGNMENT

[72] Inventor: Eriks Parups, Norwalk, Conn.
[73] Assignee: Pitney-Bowes, Inc., Stamford, Conn.
[22] Filed: Sept. 22, 1970
[21] Appl. No.: 74,253

[52] U.S. Cl. .............................270/58, 53/61, 271/50
[51] Int. Cl. ..........................B65b 39/02, B65b 57/10
[58] Field of Search ........270/57, 58, 59; 53/26, 155, 53/188, 29, 62, 61; 271/50

[56] References Cited

UNITED STATES PATENTS

| 2,736,999 | 3/1956 | Rouan et al. | 53/29 |
| 3,049,845 | 8/1962 | Hanson | 270/58 X |

*Primary Examiner*—Lawrence Charles
*Attorney*—William D. Soltow, Jr., Albert W. Scribner, Martin D. Wittstein and Louis A. Tirelli

[57] ABSTRACT

An envelope inserting machine includes a pair of insert feeding stations for delivery of inserts from each station successively along a path including a passageway formed by a frame spaced above a pick-up station and having an inlet and an outlet. Stop means are provided at predetermined distances from the inlet and are movably mounted in the frame toward and away from the pick-up station, each being operatively connected to a separate insert feeding station through actuating means, to move to an extended position for arresting the movement of an insert moving on the pick-up station from its corresponding insert feeding station and to move to a retracted position disposed out of the passageway, when the insert delivered is from another insert feeding station. The predetermined distance from the inlet at which the stop means are positioned being such that the inserts are stopped at the pick-up station in trailing edge alignment for subsequent insertion into an envelope.

12 Claims, 5 Drawing Figures

FIG. 1

INVENTOR
ERIKS PARUPS
BY
ATTORNEY

FIG. 2

APPARATUS FOR INSERT TRAILING EDGE ALIGNMENT

BACKGROUND OF THE INVENTION

This invention relates to an apparatus for filling envelopes, for example, by feeding inserts such as single sheets, booklets, cards and folded letters or other mail matter therein. This invention particularly relates to an apparatus for aligning the trailing edges of inserts having a different depth for simultaneous feeding of the inserts into, for example, an envelope.

As is well known, in business machines such as, for example, inserters, space is usually limited in the machine for the operating mechanism required. Thus it is important that the mechanism be as compact as possible.

In larger inserters having more than one insert feeding station, one apparatus for stuffing the various inserts into waiting envelopes includes means for delivering all the intended inserts simultaneously along a path perpendicular to a moving endless belt which then carries the inserts, one at a time, into an envelope.

Another apparatus used for larger inserters having multiple insert feeding stations is a chain drive feed which is mounted to pick up an insert at each insert feeding station and deliver the inserts into an envelope at the opposite end of the chain drive feed.

However, such mechanisms are too bulky to be used in smaller desk top inserters, and because of this disability, until the present, desk top inserters have been limited to a single insert feeding station because of space requirements.

Further, where higher insert feed speeds are required, prior art inserters are limited because of the mechanism required to time the feed cycle so that each insert feeding station delivers an insert to the envelope at the proper time in the cycle, thereby not operating on real time. Thus the speed of prior art inserters is dependent on auxiliary timing apparatus as well as the capability of the inserter to deliver the individual inserts.

A further problem with prior art inserters is that with auxiliary timing apparatus controlling the feed cycle for the inserts, when an insert jams in the insert feeding station, the machine will continue to operate and to feed inserts from the remaining insert feeding stations until the user recognizes the faulty operation and manually corrects the problem.

SUMMARY OF THE INVENTION

It is an object of the present invention to provide a means for stuffing inserts of different depths, into envelopes, which means is timed by the inserts arriving at a pick-up station in the inserter.

It is still another object of the present invention to provide stop means which move relative to each other in the direction of the path of movement of the inserts.

It is also an object of the present invention to provide means for releasably locking the movable stop means in any of a plurality of positions along the direction of the path of movement of the inserts.

It is an added object of the present invention to provide means for maintaining continuous driving engagement between the drive means and the stop means independently relative of movement of the stop means along the direction of the path of movement of the inserts.

It is another added object of the present invention to provide the continuous drive maintaining means with an elongate pinion which extends over the length of relative movement of the stop means and a rack carried by the stop means and engageable with the pinion in any position of the stop means.

It is still another added object of the present invention to provide the drive means with means for simultaneously driving the first and second stop means alternately between an extended and a retracted position and momentarily through an intermediate position in which both the stop means are out of the passageway.

It is still another further added object of the present invention to provide actuating means which includes means responsive to the arrival of the last of the inserts at the pick-up station, for momentarily arresting the movement of the drive means with the stop means at the intermediate position.

It is a remaining object of the present invention to provide an inserter having real time capability.

These and other objects, features and improvements of the present invention will be described in greater detail in a description below.

In accordance therewith, the present invention provides for an apparatus which includes an envelope inserting machine having means defining a path of movement for inserts of varying depth and a pickup station along the path, as well as for arresting movement of a plurality of inserts at the pickup station with the trailing edges thereof in alignment preparatory to being inserted into an envelope. The apparatus further comprises a frame disposed along the path defining means at the pick-up station and defines therewith an inlet opening, an outlet opening, and a passageway joining the openings for passage of the inserts therethrough. First stop means are movably mounted on the frame a first predetermined distance from the inlet opening for arresting the movement of one of the inserts when the first stop means is in an extended position in the passageway and second stop means are movably mounted on the frame a second predetermined distance from the inlet opening for arresting the movement of another of the inserts when the second stop means is in an extended position in the passageway such that the trailing edges of the inserts are aligned. Drive means are included in the apparatus for moving the first and second stop means alternately between the extended position and a retracted position in which the stop means are disposed out of the passageway, and means responsive to arrival of the inserts at the pickup station actuate the drive means to reverse the position of the stop means whereby the movement of inserts of varying depth are arrested at the pickup station with their trailing edges aligned for subsequent insertion into an envelope.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which.

DESCRIPTION OF THE PREFERRED EMBODIMENT

Figure 1:
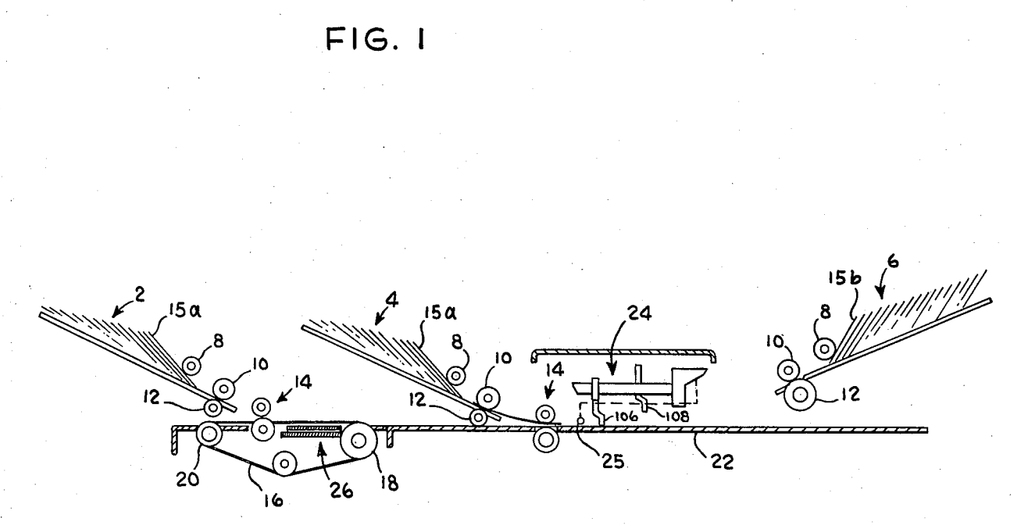
FIG. 1 is a side view in elevation of a high speed feeder mechanism for the envelope inserting machine with the apparatus for insert trailing edge alignment in place.

A high speed feeder mechanism such as that used in an envelope inserting machine is indicated generally at 1 in FIG. 1, and has a plurality of feed stations for example, a first and second insert feed station 2 and 4, respectively, and an envelope feed station 6. At each feed station, an insert feeder mechanism consisting of a support roll 8, a feed roll 10, a friction roll 12 and a pair of forwarding rolls 14 which are all well known, operate to feed an individual one of the inserts 15a of differing depths and envelopes 15b from the first and second insert feed stations 2 and 4, respectively, and the envelope feed station 6, respectively.

An endless belt 16 is driven by a drive wheel 18 and kept taut by a tension wheel 20 in a well known manner. As each of the inserts 15a is delivered to the endless belt 16 from the first insert feed station 2, it is carried thereby to the receiving platform 22, which is at a slightly lower elevation than the top of the endless belt 16. The endless belt 16 moves at a relatively high speed, carrying with it the insert 15a.

Figure 2:
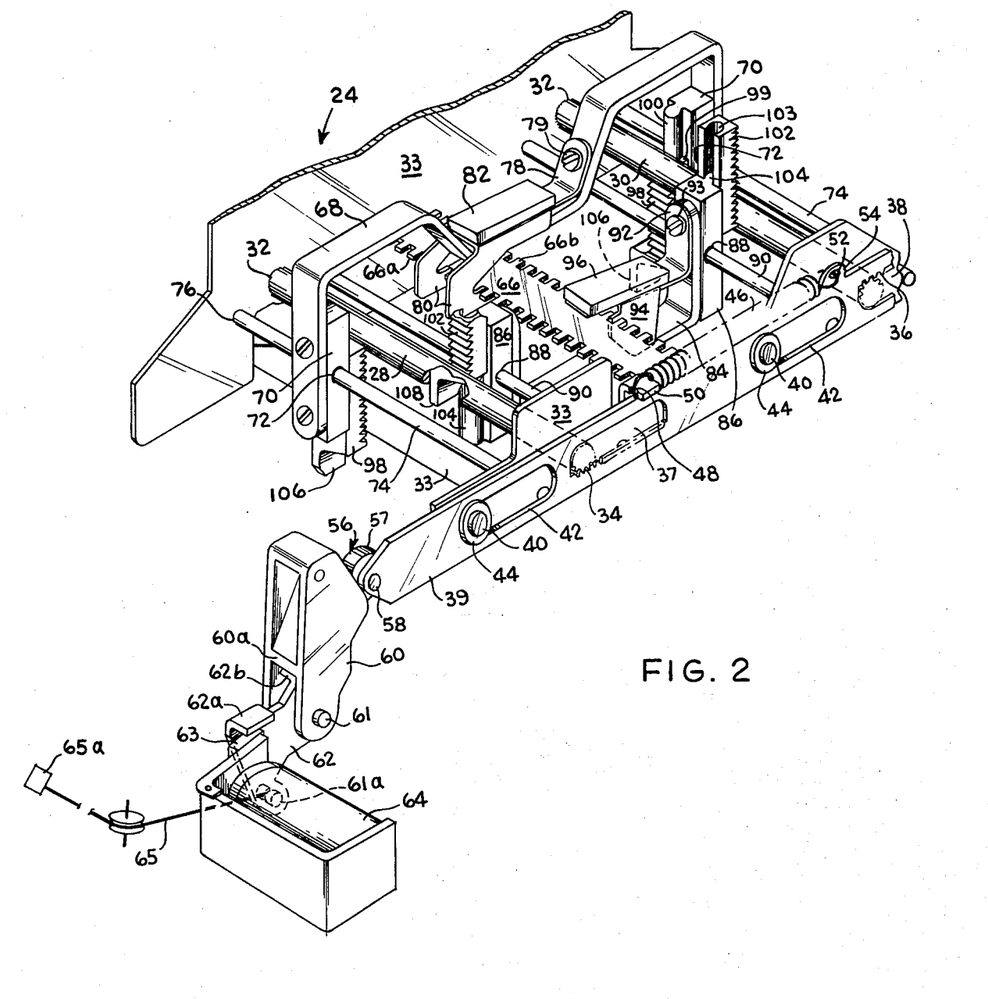
FIG. 2 is a perspective view of the apparatus for insert trailing edge alignment shown in the home or first position with cam means urging the slide into a completely biased condition.

A stopping mechanism generally indicated at 24 and shown in more detail in FIG. 2, is disposed above a portion of the receiving platform 22 forming a pickup station (unnumbered). The stopping mechanism 4 and its operation will be described in detail below, however, for the present suffice to say that the stopping mechanism 24 halts the movement of each of the inserts 15a delivered into the passageway on the receiving platform 22 at a predetermined position so that their trailing edges are in alignment, in response to a triggering mechanism, unnumbered, including an insert movement switch 25 positioned in the receiving platform 22, which is well known and which is responsive to the passage for example, of an insert across the insert movement switch 25 disposed in the path of movement for inserts at the receiving platform 22.

By action of the stopping mechanism 24, an insert 15a from the first insert feed station 2, traverses a path of movement for inserts which includes the endless belt 16, the receiving platform 22 and is stopped at the pickup station (unnumbered) on the receiving platform 22. Thereafter a second insert from the second insert feed station 4, is fed directly onto the insert path on the receiving platform 22. The insert from the second insert feed station 4 is accelerated by the action of the feed and forwarding rolls 10 and 14, respectively, to a high rate of speed. The stopping mechanism 24 is actuated by an actuating means which is responsive to passage of the inserts 15a across the insert movement switch 25, to halt or arrest the movement of each insert from the first and second insert feed stations 2 and 4, respectively, at predetermined positions. The inserts 15a are stopped at their leading edge as will be described in greater detail. The predetermined positions at which the leading edges of the inserts 15a are to be stopped at the pickup station, are dependent on the respective lengths of the inserts 15a from the first and second insert feed stations 2 and 4, respectively. Thus, to align the trailing edge of the inserts 15a at the pickup station, the longer insert must be stopped a distance in advance of the stopping position of the leading edge of the shorter insert, which is equivalent to the difference in the depth of the two inserts 15a. This trailing edge alignment or registration of the inserts 15a collected on the receiving platform 22, prepares them for movement toward the next station, as will be described below.

Although further inserts from additional insert feed stations can be grouped at the receiving platform 22, all that is shown in FIG. 1 of the drawing are two insert feed stations. These should be exemplary of any plurality of insert feed stations incorporated in inserters.

An envelope, 15b, with the mouth thereof facing the inserts, is delivered from the envelope feed station 6 through the nip of the feed roll 10 and friction roll 12 driving a single one thereof onto the receiving platform 22 where by well known means, the mouth of the envelope 15b is opened to receive the group of inserts 15a on the receiving platform 22.

Discharge means 26 such as the ram drive mechanism disclosed in U.S. Pat. No. 3,412,995 to Eriks Parups, can be used to drive the grouped inserts 15a on the receiving platform 22, forward and into the mouth of the opened envelope 15b. The ram drive strikes the aligned trailing edges of the inserts. The envelope is then sealed, the postage is metered thereon, and it is forwarded to another station, by apparatus well known in the art.

The action of the stopping mechanism 24 will now be described in greater detail and reference is made to FIG. 2 for the following description. The stopping mechanism 24 comprises a first and second pinion 28 and 30, respectively, rotatingly supported at opposite ends thereof in support means, for example openings 32 formed in the walls of an elongated, flattened, U-shaped frame 33. The frame 33 and the pickup station spaced below the frame define a passageway having an inlet opening (unnumbered) and an outlet opening (unnumbered) at the end of the frame adjacent and opposite the second insert feed station 2, respectively. Bushings, not shown, are non-slideably fitted over the ends of the first and second pinions 28 and 30, respectively, as is well known in the art, and rotatably mounted in each of the openings 32 to reduce friction when the first and second pinion 28 and 32, respectively, are rotated. One end each of the first and second pinions 28 and 30, respectively, extend beyond the openings 32 on one side of the frame 33, for engagement with a first and second rack portion 34 and 36, respectively.

The first rack portion 34 is formed into the bottom edge of a first slotted opening 37, and the second rack portion 36 is formed into the top edge of a second slotted opening 38 in a slide 39 which is slideably mounted adjacent the outside of one of the upright portions of the frame 33, by slide mounting means which are well known for example, by machine screws 40 fastened through elongated guide slots 42 formed in the slide 39 and into mating threaded holes, not shown, tapped in the upright portion of the frame 33.

A washer 44, is shown disposed between the heads of the machine screws 40 and the guide slots 42. Separation ashers, not shown, are disposed washers, the machine screw 40, between the slide 39 and the frame 33, to aid in preventing binding of the slide during its movement.

The distance between the center lines of the first and second slotted openings 37 and 38, respectively, along the slide 39 is equal to the distance between the center lines of the first and second pinions 28 and 30 respectively. The guide slots 42 allow the first and second pinions 28 and 30, respectively, to fully traverse the length of the first and second rack portions 34 and 36, respectively.

Biasing means are provided for the slide 39, for example, one end of a tension spring 46 is connected to a detent 48 on a bent finger 50, the latter being integral with the frame 33, and the other end is connected through an eye 52 formed in a tab 54 which is integral with the slide 39.

Figure 3:
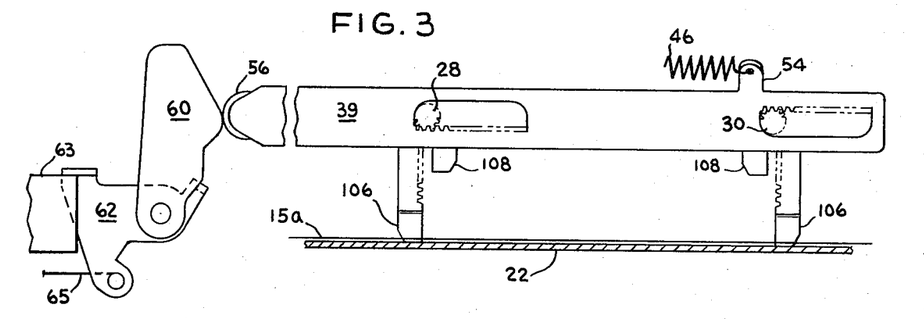
FIGS. 3, 4 and 5 are diagrammatic to show the positions of the actuating means and the drive means in the first, second and third positions respectively.

A cam follower 56 for example, a nylon wheel 57 is rotatingly mounted at one end of the slide 39 by, for example, stud 58 retained thereon by a C-ring (not shown). The cam follower 56 extends slightly beyond the edge of the slide 39. Actuating means include a cam 60 which is in pressing relation with the cam follower 56 to bias the slide 39. The legs (unnumbered) of the cam 60 fit over and are pinned by pin 61 to the top portion of a bell crank 62 for relative pivotal movement of the cam 60 and the bell crank 62 about the pin 61. The bottom end of the bell crank 62, is in turn pivotally mounted to the frame 33 by a windup pin 61a which is keyed to the bell crank 62. A clapper 63 of a clapper solenoid 64 when unenergized, is positioned to wedge under a bent tab 62a of the bell crank 62. The upper edge of the bell crank 62 forms a stoplatch 62b which supportively wedges under the rib 60a of the cam 60 pressing against the cam follower 56 and thereby holding the slide 39 in a fully biased condition, as depicted in the first position shown in FIGS. 2 and 3.

Figure 4:
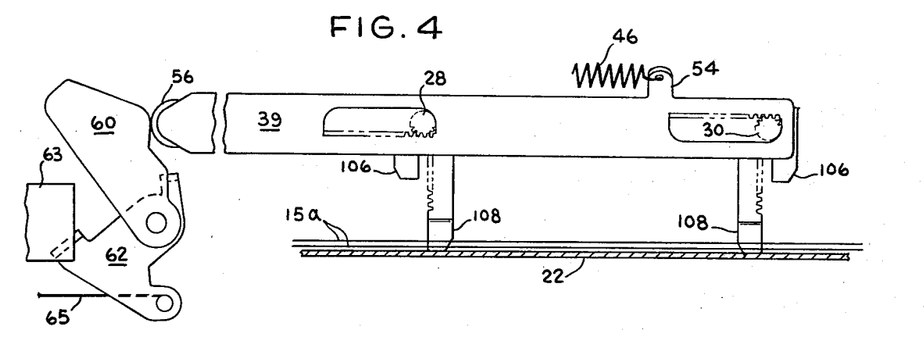

Upon an insert passing along the path of movement for inserts, the insert movement switch 25 is depressed by the leading edge thereof and held in a depressed position until released by the trailing edge passing over the insert movement switch 25. This actuation of the insert movement switch 25 places a source of voltage across the solenoid of the clapper solenoid 64 and causes energizing current to flow through the coils of the solenoid for example, by the insert movement switch 25 making a circuit complete when actuated, with a charged capacitor in series with the coils of the solenoid. When the clapper solenoid 64 is energized, the clapper 63 is attracted away from the bell crank 62, which unsupported, releases the cam 60, which in turn in its unsupported condition, pivots away from the slide 30 which is biased by the fully extended tension spring 46. The slide 39 therefore moves to the second position where it is in a fully unbiased condition, as shown in FIG. 4.

Figure 5:
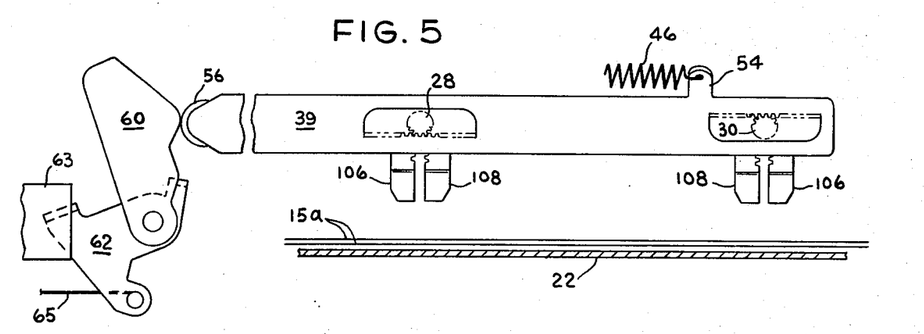

A third position shown in FIG. 5, exists when the cam 60 is urged by a cable 65 which is responsive to the trailing edge of the insert 15a from the second insert feed station 4, passing over the insert movement switch 25, for example, by the actuation of the insert movement switch 25 closing a series circuit including a motor 65a for winding the cable 65 and a source of energy, to move the slide 39 from the second position midway to the home position. The cable 65 is connected to the winding pin 61a and at the opposite end is wound on a winding means, not shown; the cable connections are shown schematically, as such connections are well known. Because of the high speed encountered in travelling to the third position, a positioning detent, not shown, can be formed in the slide 39, to act against a resilient spring member, not shown, which can be attached to the frame 33 for example, by the machine screw 40, nearest the cam follower 56. The resilient spring member and the detent are positioned to strike each other at the time that the slide is in the third position, preventing overtravel of the slide 39 without locking the same in place.

From the foregoing, it can be seen that the actuating means includes the cam 60, bell crank 62, clapper solenoid 64 and the cable 65. Also it can be seen that there is no need for auxiliary machine timing as the machine controls itself since the movement of the trailing edges of the inserts 15a over the insert movement switch 25 signals the actuating means to position the drive means to the next position.

An indexing bar 66, having square teeth on both longitudinal edges is attached by welding means or otherwise at opposite smooth ends to the inside of the upstanding portions of the frame 34. A first bridge 68 formed from bar stock into the shape of a letter M with flattened corners, is attached by screws or otherwise at its inside leg portions to a first set of guide bars 70. The first set of guide bars 70 has a lateral support or slide passage 72 formed by drilling or other means, through the sides perpendicular to the side thereof attached to the legs of the first bridge 68. A first pair of support rods 74 are fitted into openings 76 formed, for example, by drilling through upstanding walls of the frame 33. The support rods 74 are held in place for example although not shown, by turning down annular grooves for the fastening of C-rings therein adjacent both ends of the first pair of support rods 74 and the openings 76.

A first cantilevered indexing lever 78 is attached at its supported end by a screw 79 or otherwise, to the sloping top portion of the first bridge 68 and at its unsupported end is shaped into first bifurcated indexing fingers 80 spaced to fit in separated notches between the teeth of the edge 66a of the indexing bar 66, for example, having a distance between first bifurcated indexing fingers 80 extending four notches of the indexing bar 66. The first bifurcated indexing fingers 80 are bent inwards to form a center spaced portion whereby depression of the first cantilevered indexing lever 78, disengages the first bifurcated indexing fingers 80 from the indexing bar 66 permitting sliding movement of the first bridge 68 to any selectable position along the first pair of support rods 74 between the upstanding members of the frame 33, the reasons for which will be explained in greater detail below. A finger pad 82 is placed on top of the cantilevered indexing lever 78, for ease of use. The cantilevered indexing lever 78 can be made from flat spring steel which is punched and shaped.

A second bridge 84 is formed in the shape of a flattened letter "U" with its upstanding legs attached at the outside thereof, to a second set of guide bars 86, by screws or otherwise. The second set of guide bars 86, similar to the first set of guide bars 70, has a lateral support or a slide passage 88 laterally formed through the sides perpendicular to the side of the legs attached to the legs of the second bridge 84. The slide passages 88 can be formed by drilling or otherwise. A second pair of support rods 90 are fitted in openings in the upstanding members of the frame 33, in similar fashion to the mounting of the first pair of support rods 74. The second pair of support rods 90 and the second set of guide bars 86 are so positioned and formed that the second bridge 84 can slide along the second pair of support rods 90, to any position between the upstanding members of the frame 33 including sliding unhindered below the first bridge 88.

A second cantilevered indexing lever 92 is attached by a screw 93 or otherwise to the inside portion of the leg of the second bridge 84. The second cantilevered indexing lever 92 at its unsupported end is shaped into second bifurcated indexing fingers 94 which fingers mesh with the teeth on the edge 66b of the indexing bar 66. The second bifurcated indexing fingers 94 are bent inwards to form a center spaced portion whereby depression of the second cantilevered indexing lever 92, disengages the second bifurcated indexing fingers 94 from the teeth of the indexing bar 66, permitting smooth movement of the second bridge 84 along the second pair of support rods 90. A finger pad 96 is placed on top of the second cantilevered indexing lever 92 to permit ease of use.

A first pair of racks 98 are in meshing contact with first and second pinions 28 and 30, respectively, and each has a longitudinal first journal bearing 99 formed therein which slidably mates with a first journal 100 raised longitudinally on one face of each of the first set of guide bars 70. Each rack of a second pair of racks 102 has a second longitudinally disposed journal bearing 103 which is in mating relationship to slideably ride on a second journal 104, longitudinally raised on the side of the second set of guide bars 86 opposite the side attached to the second bridge 84. The second pair of racks 102 are in meshing contact with the first and second pinions 28 and 30, respectively, each being juxtaposed with one rack of the first pair of racks 98, i.e., one rack from the first pair of racks 98 and one rack from the second pair of racks 102 are on opposite sides of the first pinion 28 so that as the first pinion 28 is rotated, each rack moves in the opposite direction and similarly the two remaining racks from the first and second pair of racks 98 and 102, respectively, are on opposite sides of the second pinion 30 so that as the second pinion 39 is rotated, one rack goes up and the other rack goes down.

Likewise, by the disposition of the first rack portion 34 at the lower edge of its slotted opening 37 and the second rack portion 36 being at the upper edge of its other slotted opening 38, it can be seen that the first and second pinions 28 and 30, respectively, rotate in the opposite direction in response to movement of the slide 39. Thus, the first pair of racks 98, with teeth facing toward each other and meshing with oppositely rotating pinions, will move in the same direction. Similarly, the second pair of racks 102, with teeth facing away from each other will also respond by moving in the same direction with each other and in the opposite direction that the first pair of racks 98 move.

Although in the embodiment shown, the first and second rack portions 34 and 36, respectively are formed along the respective bottom and top of the first and second slotted openings 37 and 38 respectively, other minor variations of this arrangement will be readily apparent to those skilled in the art. Thus, the device can be constructed with the first rack portion 34 at the top of the first slotted opening 37 and the second rack portion 36 at the bottom of the second slotted opening 38, which is a mere reversal of the arrangement shown in the drawings; one rack portion must always be along the top and the other rack portion along the bottom of the slotted opening to provide for counterrotation of the first and second pinions 28 and 30, respectively. In another variation, both rack portions can be placed at the top or both rack portions can be placed at the bottom with the teeth of the first pair of racks 98 both facing in the same direction and the teeth of the second pair of racks 102 both facing in the direction opposite that faced by the teeth of the first pair of racks 98; in this variation, it will be apparent that the first and second pinions 28 and 30 will rotate in the same direction but the first pair of racks 98 will still be driven in a vertical direction opposite to that of the second pair of racks 102.

At the bottom of the first and second pair of racks 98 and 102, respectively, a first and second pair of stops 106 and 108, respectively, are formed, for example, integral with the respective racks. The length of the stops of the first and second pair of stops 106 and 108, respectively, are such that when the respective racks are in the down position, the stops interfere with the movement of sheets along the receiving platform 22, (see FIG. 1). Likewise, because of the arrangement of the first and second rack portions 34 and 36, respectively, slide 39, first and second pinions 28 and 30, respectively, and the first and second pair of racks 98 and 102, respectively, when the first pair of racks 98 are in the down position so that the first pair of stops 106 are in position to interfere with the movement of sheets along receiving platform 22, the second pair of racks 102 with the second pair of stops 108 at the bottom thereof, are in a retracted or upward position so that any sheets moving along the receiving platform 22 (see FIG. 1) are only stopped at their leading edge against the first pair of stops 106 at the bottom of the first pair of racks 98. This is the home or first position shown in FIGS. 2 and 3. In this position the cam 60 is pushing against the cam follower 56 and the slide 39 is in the completely biased position. The stop latch 62b in this position, is locked against the rib 60a of the cam 60, and the clapper 63 is wedged below the bent tab 62a.

After the insert 15a from the first insert feed station 2 strikes the first pair of stops 106 at the bottom of the first pair of racks 98, the insert movement switch 25 is depressed as described above, and upon the release thereof the clapper solenoid 64 is energized, thereby drawing the clapper 63 from underneath the bent tab 62a. The cam 60 is thus pivoted away from the biased slide 39 and the slide 39 travels to its completely unbiased condition whereby the first and second pinions 28 and 30, respectively, travel along the first and second rack portions 34 and 36, respectively, to the opposite end thereof.

The relative movement of the slide 39 and the first and second rack portions 34 and 36, respectively, rotates the first and second pinions 28 and 30, respectively, so that the first pair of stops 106 which were in the extended or downward position at the bottom of the first pair of racks 98 are moved up to the retracted position and the second pair of stops 108 which were in the retracted position at the bottom of the second pair of racks 102 are moved downward to the extended position. Thus, an insert 15a moving along the receiving platform 22 (FIG. 1) with the machine in the second position, would be stopped only by the second pair of stops 108 and would pass below the retracted first pair of stops 106.

It should be understood that the position of the first and second pair of stops 106 and 108, respectively, are predetermined so that the trailing edges of the inserts 15a from the first and second insert feed stations 2 and 4, respectively, are stopped with their leading edges against the respective first and second pair of stops 106 and 108, respectively and have their trailing edges in alignment. Once the respective positions of the first and second pair of stops 106 and 108, respectively are determined, the first and second bridges 68 and 84, respectively, are moved along their respective first and second pair of support rods 74 and 90, respectively. This is accomplished by applying pressure to the first and second fingers pads 82 and 96, respectively, thereby depressing the first and second bifurcated index fingers 80 and 94, respectively, to below the indexing bar 66. The distance between the first and second bridges 68 and 84, respectively, is predetermined to be equal to the difference between the depth of the inserts loaded in the first and second insert feed stations 2 and 4, respectively, and the set of stops corresponding to the longer insert 15a is placed furthest from the insert feed stations 2 and 4, respectively. The finger pads 82 and 96 are released when the first and second bridges 68 and 84, respectively, are in their proper predetermined positions so that the first bifurcated indexing fingers 80 mesh with the teeth 66a at one side of the indexing bar 66 and the second bifurcating indexing fingers 94 mesh with the teeth 66b on the opposite side of the indexing bar 66.

Thus, as the insert 15a from the first insert feed station 2 is delivered across the receiving platform 22 when the slide 39 is in the home position, the leading edge of the insert 15a is stopped in a first predetermined position against the first pair of stops 106 at the pickup station. When the next insert 15a from the second insert feed station 4 is delivered across the receiving platform 22, with the slide 39 now in the second position, the leading edge of the insert 15a is stopped in a second predetermined position on the pickup station with its trailing edge in alignment with the first insert 15a.

After the second insert 15a passes over the insert movement switch 25, the cable 65 is quickly tugged, drawing the bell crank 62 against the cam 60 which is rotated to put the slide 39 in a biased position travelling towards its home position. Midway between the home and second position, the cam 60 is momentarily stopped with an assist to prevent overtravel for example, by the spring and tab in the frame 33 and slide 39, respectively, as described, so that both the first and second pairs or racks 98 and 102, respectively, are in a middle position (FIG. 5) whereby inserts 15a on the receiving platform 22 (FIG. 1) are able to pass by the first and second pair of stops 106 and 108, respectively, and a drive mechanism 26 is energized to drive the grouped inserts 15a on the receiving platform 22 toward an open envelope 15b from the envelope feed station 6. The envelopes 15b are delivered from the envelope feed station 6 and opened independently of the sheet feeding and aligning mechanism. The inserts 15a of differing depths are thus stuffed into the envelope 15b.

The cable 65 then continues into tugging action, rotating the bell crank 62 against the cam 60 to return the machine to its home position for the next cycle with the clapper solenoid 64 unenergized so that the clapper 63 maintains the bell crank 62 in the home position.

Although only two insert feed stations have been described, it should be obvious to those skilled in the art, that any plurality of insert feed stations can be used in the present invention. Also, by proper switching the insert from the first insert feed station can be delivered after an insert is delivered from the second insert feed station, the only provision being that the second insert fed to the receiving platform 22 must be delivered on top of the first insert fed thereto. Also, although a pair of racks have been described for each bridge, it is also obvious to one skilled in he art that a single rack with a wider stop can also be used.

It is thus apparent from the foregoing that there has been provided a stopping mechanism for aligning the trailing edges of inserts delivered thereto which achieve the foregoing objects and advantages of the present invention. It is to be understood, however, that the invention is not to be considered as limited to the specific embodiment described above and shown in the accompanying drawings, which embodiment is merely illustrative of the best mode presently preferred for carrying out the invention and is susceptible to change in form, size, detail and arrangement of parts, but rather the invention is intended to cover all such variations, modifications and equivalents thereof as may be deemed to be within the scope of the claims depended hereto.

I claim:

1. Apparatus for aligning the trailing edges of a plurality of sheets successively received at a stopping station for subsequent dispatch of said sheets by discharge means applying a driving force to said trailing edges, wherein said sheets received include a first sheet of a first predetermined length and a second sheet of a second predetermined length, comprising:

a. a frame disposed above said stopping station and forming therewith an inlet opening, an outlet opening, and a passageway joining the openings for passage of said sheets therethrough;

b. a first stop mounted retractably with respect to said passageway below said frame, a first predetermined distance from said inlet opening, said first stop being thus mounted for halting the movement of said first sheet passing through said passageway;

c. a second stop mounted retractably with respect to said passageway below said frame, a second predetermined distance from said inlet opening, said second stop being thus mounted for halting the movement of said second sheet passing through said passageway in a position such that the trailing edge of said second sheet is aligned with the trailing edge of said first sheet, and d. drive means for driving said first and second stops to an extended position and to a retracted position, said drive means driving said first stop to said extended position and said second stop to said retracted position when said first sheet is received in said passageway and said drive means driving said first stop to said retracted position and said second stop to said extended position when said second sheet is received in said passageway, whereby said first and second sheets received in said passageway are halted therein with trailing edges aligned for discharge therefrom by said discharge means.

2. Apparatus according to claim 1, wherein said first and second stop means are mounted on said frame for relative movement with respect to each other in the direction of movement of said sheets along said path of movement, whereby the first and second predetermined distances of said stop means respectively can be set in accordance with the difference in depth between said sheets.

3. Apparatus according to claim 2, including means for releasably locking said movable stop means in any of a plurality of positions along said direction to said path of movement of said sheets.

4. Apparatus according to claim 2, wherein said drive means includes means for maintaining continuous driving engagement between said drive means and said stop means independently relative of movement of said stop means along said direction of said path of movement of said sheets.

5. Apparatus according to claim 4, wherein said continuous drive maintaining means comprises an elongate pinion extending over the length of relative movement of said stop means, and a rack carried by said stop means and engageable with said pinion in any position of said stop means.

6. Apparatus according to claim 1, wherein said drive means includes means for simultaneously driving said first and second stop means alternately between said extended and retracted position and being operable to momentarily pass said stop means through an intermediate position in which both said stop means are out of said passageway, whereby said sheets can be moved beyond said pickup station for inserting into an envelope.

7. Apparatus according to claim 6, in which said actuating means includes means for momentarily arresting the movement of said drive means with said stop means at said intermediate position, said last named means being responsive to arrival of said other of said sheets at said pickup station.

8. An apparatus as recited in claim 1, in which said drive means includes a pinion, pinion support means for rotatably supporting said pinion, a first rack having said first stop extended from the end adjacent said passageway thereof and having a journal bearing therein, a second rack having said second stop extended from the end adjacent said passageway thereof and having a journal bearing therein, a first guide bar having a journal thereon in mating relation with said journal bearing of said first rack, and a second guide bar having a journal therein in mating relation with said journal bearing of said second rack, said first and second rack being disposed in juxtaposed relationship about said pinion and in mating relation with said pinion on opposite sides thereof, whereby rotation of said pinion in one direction drives said first rack with said first stop to said extended position and said second rack with said second stop to said retracted position and rotation of said pinion in the opposite direction drives said first rack with said first stop to said retracted position and said second rack with said second stop to said extended position.

9. An apparatus as recited in claim 1, in which said drive means includes:

a. a plurality of pinion support means in the upstanding walls of said frame for rotatably securing pinions in said upstanding walls;

b. a first pinion rotatably supported at its two ends each by one of said pinion support means;

c. a second pinion rotatably supported at its two ends each by one of said pinion support means and disposed substantially parallel and spaced apart from said first pinion;

d. a first pair of guide bars each guide bar having a lateral support passage extending through two opposite faces thereof and a journal extending longitudinally along a third face thereof;

e. a first pair of racks, each having a longitudinal journal bearing in mating sliding relation with said journal of a different one of said first pair of guide bars and having said first stop affixed to the ends adjacent said passageway.

f. a second pair of guide bars, each guide bar having a lateral support passage extending through two opposite faces thereof and a journal extending longitudinally along a third face thereof;

g. a second pair of racks, each having a longitudinal journal in mating sliding relation with said journal of a different one of said second pair of guide bars and having said second stop affixed to the ends adjacent said passageway, one rack of each of said first and second pair of racks being disposed in mating juxtaposed relationship about said first pinion and the remaining rack of each of said first and second pair of racks being disposed in mating juxtaposed relationship about said second pinion, each of said first pair or racks being disposed for linear movement in a first direction and each of said second pair of racks being disposed for movement in a second direction opposite to the direction of movement of said first pair of racks, upon rotation of said first and second pinions;

h. a plurality of support rods extending parallel to said first and second pinions and fixed at either end to one of said upstanding walls, each said support rod being slidably fitted, through said support passage in one of said first or second pair of guide bars, and at least one support rod being on either side of said first and second pinion in position to maintain a corresponding one of said first or second pair of racks in meshing engagement with said corresponding first or second pinion;

i. a slide having a first rack portion disposed in meshing engagement with said first pinion and a second rack portion disposed in meshing engagement with said second pinion, said first and second rack portion being so disposed on said slide that upon said slide being moved in a first direction, said first rack portion rotates said first pinion in one direction and said second rack portion rotates said second pinion in the opposite direction; and upon said slide being moved in a second opposite direction, said first rack portion rotates said first pinion in a reverse direction to said first direction and said second rack portion rotates said second pinion in a reverse direction to said opposite direction, and j. slide mounting means for slidably affixing said slide to said frame, whereby upon said slide moving in said first direction, said first pinion is rotated in one direction and said second pinion is rotated in the reverse direction of said first pinion rotation, driving said first pair of racks in an extended position and said second pair of racks into a retracted position so that said first stop is in position to stop said first sheet and said second stop is in position to allow said first sheet to pass and upon said slide moving in said second reverse direction, said first pinion is rotated back in the opposite direction and said second pinion is rotated in the opposite direction to the reverse direction of said first pinion rotation, driving said first pair of racks into a retracted position and said second pair of racks into an extended position so that said first stop is in position to pass said second sheet and said second stop is in position to stop said second sheet.

10. An apparatus as recited in claim 1, which includes actuating means disposed on said frame, for moving said drive means to a first, second and third position, said first position being wherein said first stop is in said extended position and said second stop is in said retracted position; said second position being wherein said first stop is in said retracted position and said second stop is in said extended position, and said third position being wherein said first stop and said second stop are midway between a retracted position and an extended position, whereby a first sheet passing through said passageway is halted at a predetermined position upon said actuating means moving said drive means to said first position, a second sheet passing through said passageway is halted at a predetermined position such that the trailing edges of said first sheet and said second sheet are in alignment, upon said actuating means moving said drive means to said second position, and said discharge means is free to apply said driving force to said aligned trailing edges upon said actuating means moving said drive means to said third position.

11. An apparatus as recited in claim 9, which includes:

a. actuating means for urging said slide in a first and second direction; and b. triggering means responsive to the movement of said first and second sheet toward said stopping station and operatively connected to said actuating means to initiate said actuating means to urge said slide in a first direction upon said first sheet moving toward said stopping station and to initiate said actuating means to urge said slide in a second direction upon said second sheet moving toward said stopping station;

whereby said slide is in a first position so that said first stop is placed in an extended position and said second stop is placed in a retracted position, upon said first sheet moving toward said stopping station said first sheet is halted at a predetermined position with the leading edge thereof against said first stop and said triggering means are actuated by said first sheet movement to initiate said actuating means to urge said slide in a second direction to a second position wherein said first stop is placed in a retracted position and said second stop is placed in an extended position, upon said second sheet moving toward said stopping station it is thereby halted against said second stop in a predetermined position with said trailing edges of said first and second sheets in alignment and said triggering means are actuated by said second sheet movement to initiate said actuating means to urge said slide back toward said first direction to a third position wherein both said first and second stops are between a retracted and extended position to allow said first and second sheets to be driven by their trailing edge toward an inserting station, said actuating means continuing the urging of said slide in said first direction to return to said first position.

12. An apparatus as recited in claim 11, in which said actuating means includes:

a. a cam means having a cam surface thereon for communication with one end of said slide;

b. a bell crank rotatingly supported at its lower portion on said frame and pivotally supporting the lower portion of said cam on its upper portion, said bell crank when urged in a position of maximum rotation toward said cam means maintains said cam means in an urging position against said slide;

c. biasing means connected to said frame and to said slide, for urging said slide in a direction opposing the urging of said cam means, said biasing means thereby urging said slide to urge said cam means to pivot away from said slide;

d. clapper solenoid means having a solenoid and a clapper, said solenoid being supported on said frame and said clapper being positioned to maintains said bell crank in an urging position against said cam means when said clapper solenoid is in an unenergized condition, and said clapper to be drawn out of contact with said bell crank thereby releasing said cam means for an urging condition against said slide, when said clapper solenoid is in an energized condition, said biasing means thereby urging said slide to pivot said cam means away from said slide;

e. cable winding means attached to said frame and operatively connected to said triggering means; and f. cable means attached at one end to said bell crank and at the opposite end operatively connected to said cable winding means, said cable and cable winding means being disposed for urging said cam means into a locking position with said bell crank and said clapper;

whereby said cable winding means when activated by said triggering means forces said cable means into an urging condition with said bell crank which urges said cam means against said slide into a first position wherein said clapper is wedged against said bell crank, said slide being biased assumes a second position when said clapper solenoid is energized thereby freeing said bell crank and allowing said cam means to pivot downwards out of the path of said slide, which slide travels to a maximum unbiased condition thereupon said cable winding means conditions said cable means to urge said bell crank into an urging condition against said cam means in a direction against said slide to bias said slide, thereby placing said slide in a third position midway between said first position and second position, said cable winding means continuing said urging of said cable against said bell crank which pushes against said cam means and said cam means pushes against said slide to position said slide in said first position.

* * * * *